Jan. 25, 1949.                C. PERRY                2,460,189
                       SAW FILE HOLDER AND GUIDE
Filed July 17, 1947                              2 Sheets-Sheet 1

INVENTOR.
Clarence Perry
BY Victor J. Evans & Co.
ATTORNEYS

Jan. 25, 1949. C. PERRY 2,460,189
SAW FILE HOLDER AND GUIDE
Filed July 17, 1947 2 Sheets-Sheet 2
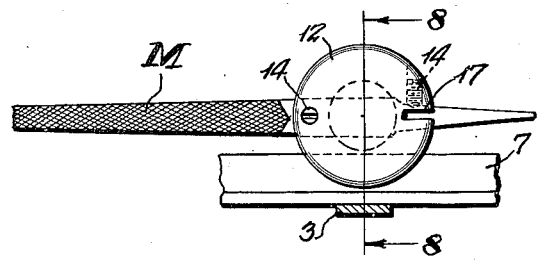
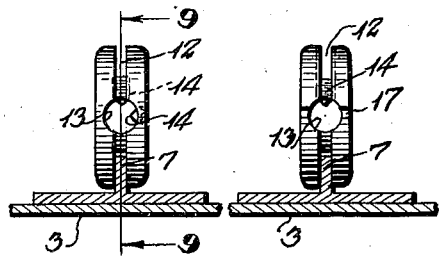
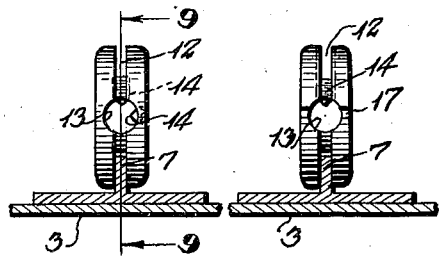
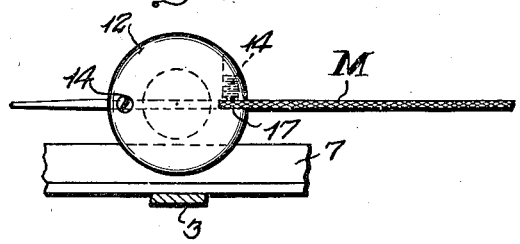
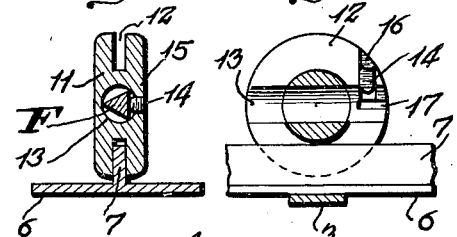
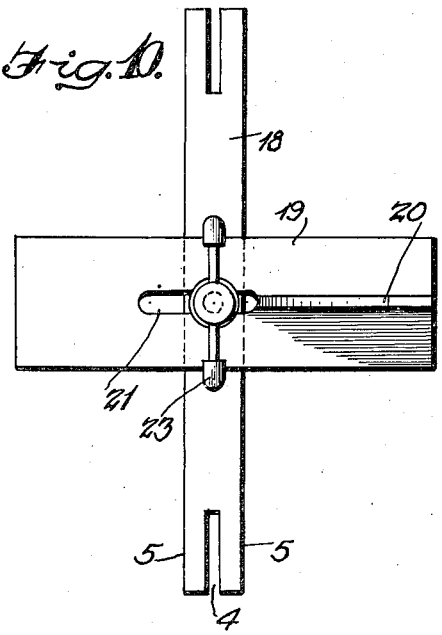
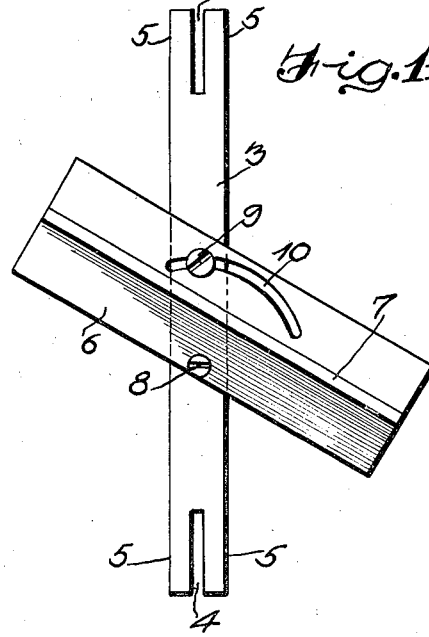
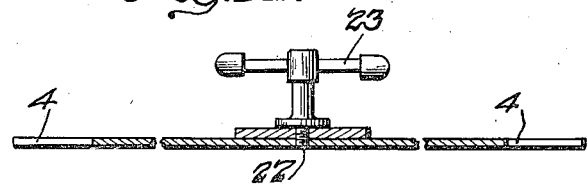
INVENTOR.
Clarence Perry
BY Victor J. Evans & Co.
ATTORNEYS Patented Jan. 25, 1949

2,460,189

UNITED STATES PATENT OFFICE 2,460,189

SAW-FILE HOLDER AND GUIDE

Clarence Perry, Santa Ana, Calif.

Application July 17, 1947, Serial No. 761,670

4 Claims. (Cl. 76—31)

My present invention relates to the general class of manually operated metal tools and implements, and more specifically to an improved saw-file holder and guide of the reciprocating type for use in saw making, and for sharpening and dressing the teeth of saws.

While the implement of my invention is well adapted for use with various kinds of saws, it is especially designed for filing the teeth of circular cross cut saws; and the file-holder is equipped with means for retaining various types of files, as for instance a three-corner file triangular in cross section, as well as a flat file for mill saws.

The primary object of the invention is the provision of an implement of this type that is composed of a minimum number of standardized parts that may with facility be manufactured at low cost of production, and the parts may be assembled with convenience to constitute an appliance that is easily installed, may be adjusted quickly, and which may be operated with accuracy for the efficient performance of its functions.

The invention consists in certain novel features of construction and combinations and arrangements of parts involving a brace for the saw, and a manually reciprocable file and holder with guide means, as will hereinafter be described and more particularly set forth in the appended claims.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these exemplifying drawings and mechanical structures, within the scope of my claims, without departing from the principles of the invention.

Figure 4 is a detail elevation of the file holder with a three-cornered file mounted therein, as distinguished from the triangular or three-corner file in the preceding figures of drawing.

Figure 5 is another detail elevation of the file holder equipped with a flat file.

Figures 6 and 7 are opposed end elevations of the file holder.

Figure 8 is a transverse sectional view at line 8—8 of Fig. 4; and Figure 9 is a vertical sectional view of the holder on the line 9—9 of Figure 6;

Figure 10 is a plan view of the adjustable saw brace; and Figure 11 is a plan view of the guide for the file holder.

Figure 12 is a sectional detail view of the saw brace.

Figure 1:
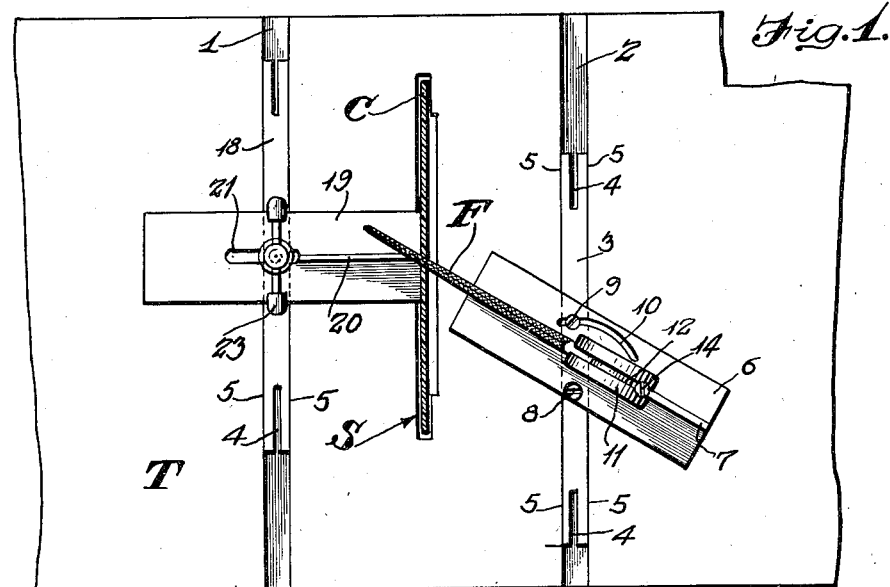
Figure 1 is a plan view showing a saw and saw table equipped with the implement of my invention.
Figure 2:
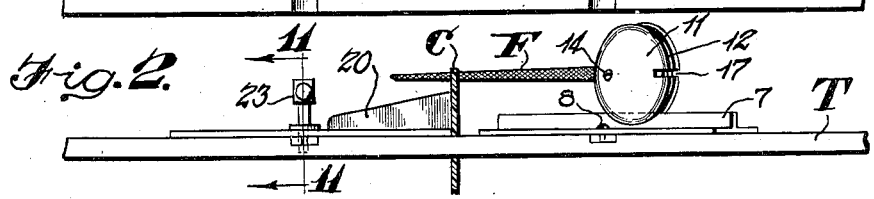
Figure 2 is a view in front elevation of the structure in Fig. 1.

In order that the general relation and utility of parts may readily be understood I have illustrated a saw table top T that is slotted at S for the circular cross cut saw C, and the table top is provided with a pair of parallel grooves 1 and 2, one at each side of the saw and its slot.

In actual practice a three corner file F, triangular in cross section may be employed as here illustrated, or other types of files, as the flat milling file M, may be substituted for the file F, to suit different conditions and purposes.

The file-holding assembly or unit for use with the saw includes a flat base plate 3 that is slidably mounted in the groove 2 for adjustment in relation to the saw, and this base or plate is frictionally held or retained in adjusted position against the lateral walls of the groove by resilient flaring ends of the base plate. For this purpose the ends of the base plate are split or longitudinally slotted at 4, 4 to form lateral resilient tongues 5, 5, that frictionally engage the walls of the groove to resiliently retain the base plate in adjusted position, but which permit adjustment of the plate under suitable force.

The base plate affords a support for a horizontally disposed guide plate 6, which is of T-shape to provide an upper vertical track flange 7, and the guide plate is adjustable on the pivot screw 8 threaded into the base plate. For retaining the guide plate in adjusted position with relation to the saw, a set screw or bolt 9 is passed through an arcuate slot 10 in the guide plate and threaded into the base plate.

The track flange of the guide plate is adapted to support and guide a reciprocable, manually operated, file holder 11, preferably made in the form of a flat circular disk, and fashioned with an exterior annular or circumferential groove 12 that provides a pair of annular and spaced walls to fit over and co-act with the track flange 7.

The solid central part of the disk is formed with a diametrically arranged bore 13 for the reception of a file, as F, and a lateral set screw 14 is threaded in an axial socket 15 of the disk for impingement against, and retention of the file.

For the accommodation of a flat mill file M, the same screw 14 may be threaded in another socket 16, and the file holder has slots or grooves 17 for the shank of this file.

For bracing or backing up the saw during the filing operations, a unitary brace is adjustably mounted in the groove 1 at the opposite side of the saw, and a friction-retained adjustable brace plate or base plate 18 is provided for the bracing unit.

Figure 3:
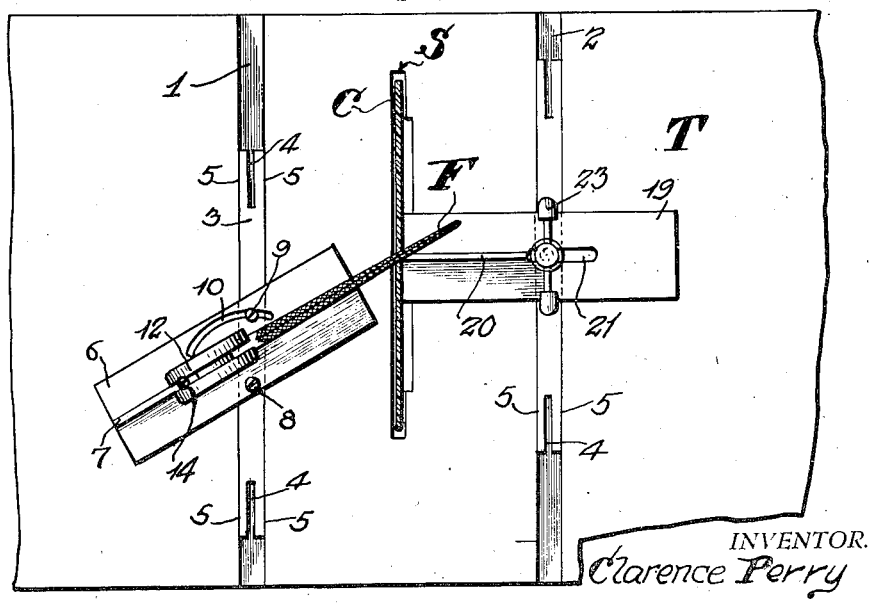
Figure 3 is a view similar to Fig. 1, but showing the equipment shifted to the opposite side of the saw to be sharpened.

The base plates 3 and 18 are interchangeable in order that the filing unit and the bracing unit may be shifted to opposite sides of the saw, for filing purposes, as indicated by the positions of these units in Figs. 1 and 3.

The base plate or slide 18 is also equipped at its flared ends with slots 4, 4 and resilient tongues 5, 5, for co-action with the walls of a selected groove 1 or 2; and of course the base 3 is also interchangeable and adapted for retention in either groove 1 or 2.

For bracing the saw a horizontally disposed brace plate 19 having an upright bracing flange 20 for contact with the side face of the saw, is provided with a longitudinal slot 21 to accommodate a clamp bolt 22 that is provided with a handle 23 and passed through the slot and threaded in the base plate 18, for quick detachment in adjusting the brace plate to the saw.

With the filing unit and the bracing unit in the properly adjusted positions of Figs. 1 and 3, for accurately cutting the saw teeth to the required angle, the file is correctly adjusted and retained in its holder, and the file and holder are manually reciprocated.

With the holder grasped in a hand and manually reciprocated, the grooved holder travels over and is guided by the track flange, and the various changes in operative positions of the file with respect to the saw teeth may be accomplished with facility for precision filing of the saw teeth. In the hand of an expert craftsman the filing of the saw teeth may be accomplished with accuracy and expedition, and in the hands of a novice or amateur, with a little practice, the device of my invention may be handled with skill, for maintaining the saw in efficient working condition.

While I have illustrated one type of saw and two types of files, it will be understood that the device of my invention may be adapted for filing other types of saws, and other types of files may also be employed, selectively, in the holder.

Having thus fully described my invention what I claim as new and desire to secure by Letters Patent is:

1. In a file holder and guide the combination with a base plate having a bifurcated end forming laterally resilient tongues adapted to frictionally engage the walls of a groove, and an adjustable track-plate pivotally mounted on the base plate, of a manually operated holder having a pair of spaced annular walls movable on the track-plate, and a file rigidly mounted in the holder.

2. In a file holder and guide, the combination with a slidable base plate having laterally resilient tongues adapted to frictionally engage the walls of a groove, of a manually operated holder having a diametrically arranged bore, a file mounted in the bore, and means for retaining the file, and an adjustable track-plate pivotally mounted on the base plate for supporting the holder.

3. In a manually operated saw-filing appliance, the combination with a table having a pair of grooves arranged at opposite sides of a saw, a pair of frictionally retained base-plates adjustable in the grooves, a second pair of plates adjustably mounted on the base plates, one of said pair having a saw-brace and another of said pair having a track-flange, a holder reciprocably mounted on the track-flange, and a file rigidly mounted in the holder.

4. A file holder and guide as in claim 2 wherein said file holder comprises a circular disk having an exterior annular groove therein forming said spaced annular walls and a diametrically arranged bore is provided in said disk to receive the file and means is provided for rigidly mounting the file in the bore.

CLARENCE PERRY.

REFERENCES CITED

The following references are of record in the file of this patent:

UNITED STATES PATENTS

| Number | Name | Date |
| --- | --- | --- |
| 95,871 | Bell | Oct. 19, 1869 |
| 193,182 | Root | July 17, 1877 |
| 384,829 | Eaton | June 19, 1888 |
| 1,314,914 | Stewart | Sept. 2, 1919 |
| 1,328,159 | Kramer | Jan. 13, 1920 |